United States Patent Office 2,825,930
Patented Mar. 11, 1958

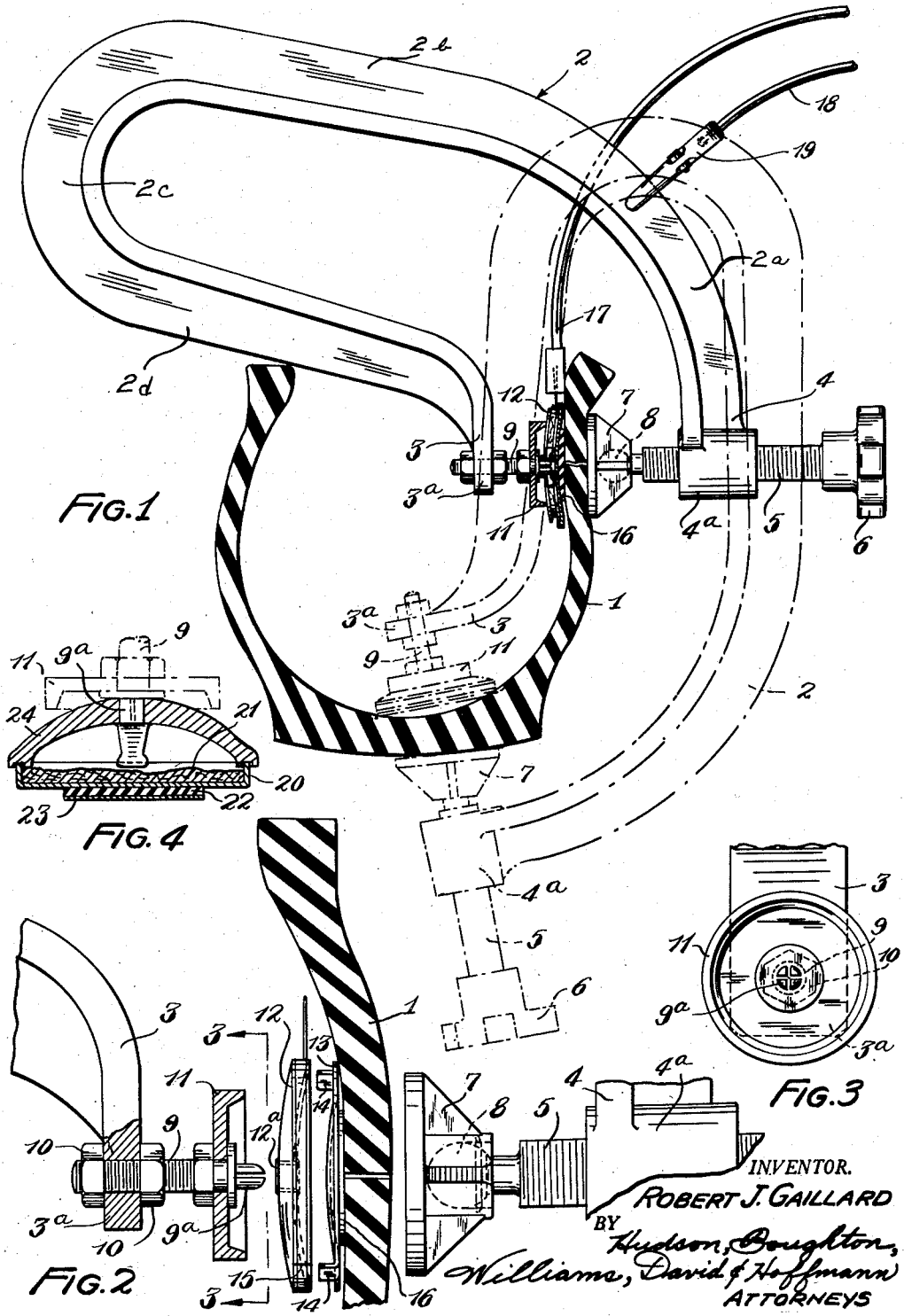

2,825,930

CLAMP FOR USE IN PATCHING TUBELESS TIRES

Robert J. Gaillard, Garfield Heights, Ohio, assignor to The Dill Manufacturing Company, Cleveland, Ohio, a corporation of Ohio Application November 16, 1954, Serial No. 469,120

6 Claims. (Cl. 18—18)

The present invention relates to a clamp which is especially and particularly designed for use in connection with the patching and patch repair of a tubeless tire.

The object of the invention is to provide a clamp which may be conveniently handled in patching a tubeless tire where the patching requirement is located upon the inner surface of the tire opposite the tread and equally convenient for use upon the inner surface of a side wall of the tire.

A further object of the invention is to provide such a clamp having the frame of the clamp so constructed and disposed that when the repair requirement is in connection with the tread portion of the tire, the clamp construction will provide ample room into which the side wall portion of the tire may move in order to permit the effective operation of the clamp.

Reference should be had to the accompanying drawings forming a part of this specification in which:

Fig. 1 shows in elevation a clamp and in sections certain portions of a heating element and also shows a tubeless tire in cross section;

Fig. 2 is a side elevation of a part of the clamp with the parts associated therewith shown in their relationship to the clamp;

Fig. 3 is an end elevation along the line 3—3 of Fig. 2 and,

Fig. 4 shows partly in section and in elevation a modified support for a heating element and patching element which may be used in connection with the clamp.

Tubeless tires when punctured, may be repaired by the application of suitable patching material heated in situ to a vulcanizing temperature and held under pressure until the vulcanizing action is completed.

The herein disclosed clamp with its provision for employing a vulcanizing heating element, as well as a pressure producing element, enables repairs upon a tubeless tire to be made easily and provides a device where at least under certain circumstances, a repair may be made upon the road.

Experience has demonstrated that cold patching of a tubeless tire is not satisfactory because of the fact that where such practice is employed the rubber is not forced into the wound in the tire. In repairing a tubeless tire it is required, if a satisfactory repair is to be made, that patch rubber heated to a vulcanizing temperature, be pressed under considerable pressure so that at least a portion of the rubber enters the wound or hole produced by the puncture.

Where a clamping device is to be used in repairing a punctured tubeless tire and the puncture occurs in the vicinity of the thickest part of the tire, which is the tread portion, it is necessary to provide a clamp which is so constructed that when the clamp is applied to the tread portion there will be ample accommodation for the side wall of the tire and of such a nature as to in no way interfere with the application of the clamp to that portion of the tire which constitutes the tread.

In referring to the accompanying drawing, a tubeless tire in cross section is indicated at 1, and in order to make clear certain features of the clamp, which facilitate its use either in connection with a repair necessitated in the side wall of a tire or in the tread portion of a tire, we have shown in full lines and in elevation a clamp 2 applied to a tire where the repair to be made is in the side wall of the tire and in dotted lines there is shown the same clamp when the repair to be made is in connection with the thicker or tread portion of the tire. In both instances the construction and operation of the clamp are the same.

The clamp comprises a frame which is formed as a loop 2 having an elongated curved arm 2a, integrally connected to a substantially straight arm portion 2b; the latter merging into a reversely curved end portion 2c thereby closing one end of the loop. Said reversely curved portion, on the opposite side of the loop, integrally connects to a substantially straight arm portion 2d, the latter being spaced from the aforesaid arm portion 2b, and diverging outwardly in coplanar relation from the same. The end 4 of the curved arm 2a at the open end of the loop is integrally attached to a supporting head 4a, whereas the end of the arm portion 2d, as indicated at 3, extends laterally outwardly from the latter in substantially parallel spaced relation to the end 4 of the curved arm portion 2a and is integrally connected to a supporting head 3a.

The heads 3a and 4a are in axial alignment and a line perpendicular to the said axis upon which the heads 3a and 4a are located, is at a decided angle with respect to the major axis of the said loop. By the foregoing we mean an angle which at least approximates a right angle. Another way of looking at it is that the flattened loop extends away from and essentially at one side of a line which is perpendicular to the axial line for the heads 3a and 4a.

The supporting head 4a has an opening therethrough which is threaded and receives a threaded shaft 5 which at one end has an operating handle 6 and at the opposite end has a pressure platen 7. This pressure platen is mounted upon the end of the shaft 5 by means of a ball and socket arrangement, which is indicated at 8 so as to give adjustability for the platen head in its use.

The supporting head 3a has mounted thereon a means for engaging, supporting, and positioning a vulcanizing unit so that a patch of uncured rubber may be placed over the wound in the tire where the repair is to be made, which patch is in contact with the heating element and providing for such alignment with respect to the heating element and the platen 7, as will produce the necessary pressure and heat in accomplishing the vulcanizing and repair procedure.

The head 3a in the present instance, as shown more particularly in Fig. 2, has a post member 9 which is mounted upon the head 3a by means of an opening in the head 3a through which the post 9 extends, the part being held in its position by means of nuts 10. Also mounted at an end of the post 9 is a plate 11 which is secured to the post. Also the end of the post 9 is provided with a split extension which is round, as indicated at 9a in Fig. 2, and also in Fig. 3. This particular construction is for the purpose of receiving and supporting an electric heating element 12 which at its central portion has a hollow grommet 12a. This electric heating element does not need to be particularly described because the construction of the heating element forms no part of the present invention.

Cooperating with the heating element is a patch plate 13, which is provided with upstanding flanges 14 which are adapted to engage with notches in the heating element 12, one of which notches is shown at 15 in Fig. 2. This plate 13 has adhering thereto an unvulcanized patch member 16, the arrangement being such that when all the parts are in their final operating position the plate 13 is properly placed upon the heater 12 and the patch 16 is pressed against the wound in the tire and heated to the required temperature for vulcanization.

Preferably the heating element with its cooperating patch plate and patch are of the kind which is disclosed in Patent Re. No. 21230, granted October 10, 1939.

In order to provide the required pressure during the vulcanizing operation, the head 11 with the heating element 12, and the patch plate and patch, are subject to the compressive effect produced by the platen 7 which by operation of the handle 6 is moved into clamping position with respect to the outer portion of the tire which is being repaired.

Where the repair is to be made to the side wall of a tire, the arrangement of the parts is clearly illustrated in full lines in Fig. 1. There is also shown in dotted lines the arrangement of the various parts where the repair to the tire is to be made at the tread portion of the tire. So far as the arrangement of the platen 11, the heater 12, the patch plate 13 and the platen 7, is concerned the arrangement and the cooperation between the parts is precisely the same whether the repair is made to the side wall of the tire or to the tread portion of the tire.

Attention is called to the fact, however, that where, as shown in the dotted line position, the repair is to be made to the tread portion of the tire, the formation of the loop frame is such that the side wall of the tire extends into said loop and thus does not in any way interfere, but rather facilitates the application of the clamp to its proper position in effecting repair on a tubeless tire at the tread portion thereof. This is very important. In addition, when a repair is to be made to said extending side wall subsequent to a repair to the tread portion, the formation of the loop frame facilitates moving and raising the tool such as to carry the supporting heads 3a and 4a along opposite surfaces of the side wall to an extreme position, such as shown in full lines in Fig. 1, without first requiring that the tool be completely removed from the tire and then repositioned.

In connection with the electric heater, we have indicated that a conductor 17 is connected with the electric heater 12 and a second conductor 18 is connected by a suitable snap clamp 19 with the frame of the clamp. It will be seen that the casing of the heater is electrically grounded to the clamp, which, by the way, is made of metal, usually iron or aluminum, and so when the arrangement is effective, which has just been pointed out, current may be supplied to the electric heater.

The clamp and its arranged parts may be used with a vulcanizing heater unit of different construction than the electric heater to which reference has been made. There are available and in use in the market what are generally referred to as a match patch unit. In general, such a unit comprises a shallow pan such as indicated at 20 in Fig. 4. Within this pan is a filling 21 which consists of fibrous material which is chemically treated, so that it may be ignited by the use of a match and will burn until the burnable material 21 is consumed. Usually upon the bottom of the pan 20 there is a patch 22 of uncured rubber covered by a piece of Holland cloth 23.

In utilizing such a match patch unit in connection with the present clamp, instead of utilizing platen 11, a spider 24 is used which is carried upon the end 9a of the post 9, the spider having a plurality of legs engaging with the periphery of the pan 20.

So far as the cooperative relation between the tire to be patched and the construction described with relation to Fig. 4, the operation would be precisely the same as that which has been described with respect to the electric heater.

It will, of course, be understood that in using any patch, either in connection with the electric heater setup or the match patch unit setup the patching material is of uncured rubber and any protecting cover of Holland cloth is removed before its use in the patching operation.

Having thus described my invention, I claim:

1. A clamp for use in patching tubeless tires, said clamp comprising a frame in the form of an approximate loop, the major axis of which loop is of greater length than the transverse width of the loop, the said frame having an open portion, the ends of the frame at the open portion having in axial alignment oppositely disposed spaced apart supporting heads, the vertical axis of the said supporting heads being at a decided angle with respect to said major axis of the loop, one of said heads being provided with means for supporting a vulcanizing heater and the opposite head provided with means for supporting a pressure platen.

2. A clamp for use in patching tubeless tires, said clamp comprising a frame in the form of a flattened loop, said loop having an open portion, the ends of the loop at the open portion having in axial alignment oppositely disposed supporting heads, one of said heads being provided with means for supporting a vulcanizing heater and the opposite head being provided with means for supporting a pressure platen, the side members of the frame comprising the flattened loop extending away from and to one side of a line at right angles to the axis of the said supporting heads.

3. A clamp for use in patching tubeless tires, said clamp comprising a frame in the form of a flattened loop, the said frame having end portions the said end portions being curved, each end having head portions the said head portions being oppositely disposed and in axial alignment, one of said heads being provided with means for supporting a vulcanizing heater and the opposite head being provided with means for supporting a pressure platen, the elongated loop extending at one side of and away from a line at right angles to the axis of the head portions of the loop.

4. A clamp for use in patching tubeless tires, comprising a frame in the form of a unitary loop having on its one side an elongated curved arm integrally connected to a first straight arm portion and on its opposite side a second straight arm portion, said straight arm portions being disposed in side-by-side diverging coplanar relation by an interconnecting reversely curved end portion closing one end of said loop, said elongated curved arm and said second straight arm portion each having a free end mounting a head portion, each of said head portions being spaced one from the other in axial alignment, one of said head portions being provided with means for supporting a vulcanizing heater, and means on the other of said head portions for adjustably supporting a pressure platen.

5. A clamp for use in patching tubeless tires as defined in claim 4 and characterized by having the free ends of said elongated curved arm and second straight arm portion in substantial parallel spaced relationship and mounting the head portions in axial alignment.

6. A clamp for use in patching tubeless tires as defined in claim 4 and characterized by having the free end of the second straight arm portion extending laterally outwardly from the latter and mounting a head portion in spaced axial alignment relative to the other of said head portions.

References Cited in the file of this patent

UNITED STATES PATENTS

| | | |
|---|---|---|
| 1,146,536 | Vandergrift | July 13, 1915 |
| 1,270,154 | Heim | June 18, 1918 |
| 1,376,196 | Fredd | Apr. 26, 1921 |
| 1,983,705 | Pilblod | Dec. 11, 1934 |
| 2,347,952 | James | May 2, 1944 |
| 2,447,740 | Crowley | Aug. 24, 1948 |
| 2,668,984 | Gaschi | Feb. 16, 1954 |